United States Patent
Guidi et al.

(10) Patent No.: US 12,491,156 B2
(45) Date of Patent: Dec. 9, 2025

(54) CARRIER PARTICLES FOR DRY POWDER FORMULATIONS FOR INHALATION

(71) Applicant: Chiesi Farmaceutici S.p.A., Parma (IT)

(72) Inventors: Tomaso Guidi, Parma (IT); Andrea Benassi, Parma (IT)

(73) Assignee: CHIESI FARMACEUTICI S.P.A., Parma (IT)

( * ) Notice: Subject to any disclaimer, the term of this patent is extended or adjusted under 35 U.S.C. 154(b) by 795 days.

(21) Appl. No.: 17/763,595

(22) PCT Filed: Sep. 22, 2020

(86) PCT No.: PCT/EP2020/076369
§ 371 (c)(1),
(2) Date: Mar. 24, 2022

(87) PCT Pub. No.: WO2021/058454
PCT Pub. Date: Apr. 1, 2021

(65) Prior Publication Data
US 2022/0331244 A1    Oct. 20, 2022

(30) Foreign Application Priority Data
Sep. 24, 2019   (EP) .................................... 19199337

(51) Int. Cl.
*A61K 9/00* (2006.01)
*A61K 31/573* (2006.01)
*A61K 47/26* (2006.01)

(52) U.S. Cl.
CPC .......... *A61K 9/0075* (2013.01); *A61K 31/573* (2013.01); *A61K 47/26* (2013.01)

(58) Field of Classification Search
CPC ..... A61K 9/0075; A61K 31/573; A61K 47/26
See application file for complete search history.

(56) References Cited

U.S. PATENT DOCUMENTS

| | | | | |
|---|---|---|---|---|
| 2015/0017248 | A1* | 1/2015 | Pasquali | A61K 9/0075 424/490 |
| 2018/0325816 | A1* | 11/2018 | Cavecchi | A61K 31/40 |

FOREIGN PATENT DOCUMENTS

| | | |
|---|---|---|
| CN | 1132477 A | 10/1996 |
| EA | 021901 B1 | 12/2009 |
| EP | 0663815 B1 | 3/1998 |
| WO | WO-9509616 A1 | 4/1995 |
| WO | WO-9524889 A1 | 9/1995 |
| WO | WO-9602231 A1 | 2/1996 |
| WO | WO-9623485 A1 | 8/1996 |
| WO | WO-9831350 A1 | 7/1998 |
| WO | WO-9831351 A1 | 7/1998 |
| WO | WO-0033789 A2 | 6/2000 |
| WO | WO-0178693 A2 | 10/2001 |
| WO | WO-0178695 A2 | 10/2001 |
| WO | WO-0189491 A1 | 11/2001 |
| WO | WO-0189492 A1 | 11/2001 |
| WO | WO-2004012801 A1 | 2/2004 |
| WO | WO-2007068443 A1 | 6/2007 |
| WO | WO-2008000482 A1 | 1/2008 |
| WO | WO-2011120779 A1 | 10/2011 |
| WO | WO-2011131663 A1 | 10/2011 |
| WO | WO-2013037809 A1 | 3/2013 |
| WO | WO-2013110632 A1 | 8/2013 |
| WO | WO-2014095700 A1 | 12/2013 |
| WO | WO-2015091685 A1 | 6/2015 |
| WO | WO-2016000983 A1 | 1/2016 |
| WO | WO-2018206619 A1 | 11/2018 |

OTHER PUBLICATIONS

International Search Report and Written Opinion for International Application No. PCT/EP2020/076369, mailed on Dec. 17, 2020, European Patent Office, Netherlands, 9 pages.

Staniforth, J.N., et al., "Effect of vibration time, frequency and acceleration on drug content uniformity," *Journal of Pharmacy and Pharmacology* 34:700-706, Oxford University Press, England (Nov. 1982).

Vidgren, M., et al., "Effect of powder inhaler design on drug deposition in the respiratory tract," International Journal of Pharmaceutics 42(1-3):211-216, Elsevier, Netherlands (Mar. 1988).

* cited by examiner

*Primary Examiner* — Carlos A Azpuru
(74) *Attorney, Agent, or Firm* — STERNE, KESSLER, GOLDSTEIN & FOX P.L.L.C.

(57) ABSTRACT

The present invention concerns carrier particles for dry powder formulations for inhalation and a process for their preparation thereof.

18 Claims, No Drawings

CARRIER PARTICLES FOR DRY POWDER FORMULATIONS FOR INHALATION

TECHNICAL FIELD

The present invention concerns carrier particles for dry powder formulations for inhalation and a process for their preparation thereof.

BACKGROUND OF THE INVENTION

Dry powder inhalation (DPI) drug therapy has been used for many years to treat respiratory conditions such as asthma, chronic obstructive pulmonary disease (COPD), and allergic rhinitis.

Compared to oral drug intake, only relatively small doses are needed for effective therapy as first pass metabolism is significantly reduced. Such small doses reduce the body's exposure to the drug and minimize side effects. Systemic adverse effects are also reduced as topical lung delivery takes the drug directly to the site of action. Lower dosage regimens may also provide considerable cost savings, particularly where expensive therapeutic agents are concerned.

Dry powder forms are typically formulated by mixing the drug in micronised form with coarse carrier particles, giving rise to ordered mixture where the micronised active particles adhere to the surface of the carrier particles whilst in the inhaler device.

The carrier makes the micronised powder less cohesive and improves its flowability, making easier handling the powder during the manufacturing process (pouring, filling etc.).

During inhalation, the drug particles separate from the surface of carrier particles and penetrate the lower lungs, while the larger carrier particles are mostly deposited in the oropharyngeal cavity.

The re-dispersion of drug particles from the carrier surface is regarded as the most critical factor which governs the availability of the medicament to the lungs. This will depend on the mechanical stability of the powder mix and the way this is influenced by the adhesion characteristics between the drug and the carrier and the external forces required to break up the non-covalent bonds formed between adhering particles. Too strong bonds between adhering particles may prevent indeed the separation of the micronized drug particles from the surface of carrier particles.

Different approaches aimed at modulating the adhesion have been proposed in the art to promote the release of the drug particles from the carrier particles and, hence, to increase the respirable fraction.

For instance, it has been suggested to add fine particles of an excipient and/or ternary agents with lubricant or anti-adherent properties.

Examples of said approaches are reported in EP 663815 WO 96/02231, WO 96/23485, WO 00/33789, WO 01/78693, and US 2015/017248.

An alternative method to formulate dry powders for inhalation with improved flowability is to agglomerate, in a controlled manner, the micronised particles to form spheres of relatively high density and compactness. The process is termed spheronisation and when, before spheronisation, the active ingredient is mixed with a plurality of fine particles of one or more excipient, the resulting product has also been termed as soft pellets.

Examples are reported in WO 95/24889, WO 98/31350, WO 98/31351 and WO 01/89491 and WO 01/89492.

In WO 01/89491 and WO 01/89492, it is generically envisioned the possibility of adding a coarse carrier having a mean particle size greater than 25 micrometers.

However, soft pellets may reach a so high internal coherence as to compromise their breaking up into the small particles during inhalation; such drawback could be regarded as a critical step when medium-high or high-resistance dry powder inhalers are used.

With said inhalers, lesser energy is indeed available for breaking up the pellets into the small primary particles of the active ingredient.

On the other hand, ternary agents are inhaled by the patients and hence add a regulatory burden when seeking approval of the product.

Therefore, it would be advantageous to provide a platform technology for the administration of active ingredients in form of powder by inhalation with improved aerosol performances without the use of ternary agents.

SUMMARY OF THE INVENTION

The invention is directed to a dry powder formulation for administration by a dry powder inhaler (DPI) comprising:
a) a fraction of spheronised particles having a mass diameter of between 100 and 800 micrometers comprising micronized particles of one or more active ingredients and micronized particles of a physiologically acceptable excipient in a suitable ratio by weight;
b) a fraction of coarse particles comprising a physiologically acceptable excipient having a mass diameter comprised between 150 and 400 micrometers,
wherein the ratio between the fraction a) and the fraction b) is between 5:95 and 50:50 percent by weight.

In a second aspect, the invention is directed to a process for preparing the claimed formulation, said process comprising the steps of:
i) preparing a fraction of micronized particles of the active ingredient and the physiologically acceptable excipient;
ii) optionally conditioning the obtained mixture;
iii) subjecting the mixture to agglomeration and spheronisation to obtain the spheronised particles;
iv) optionally sieving to isolate the fraction having the desired diameter;
v) adding the fraction of coarse particles b);
vi) mixing the obtained mixture.

In an embodiment, the fraction of step i) is prepared by mixing the micronized particles of the active ingredient and micronized particles of the physiologically acceptable excipient.

In an alternative embodiment, the fraction of step i) is prepared by co-micronizing the particles of the active ingredient and the particles of the physiologically acceptable excipient together, then mixing.

A fourth aspect concerns a dry powder formulation for administration by a dry powder inhaler (DPI) comprising:
a) a fraction of spheronised particles having a mass diameter of between 100 and 800 micrometers comprising micronized particles of one or more active ingredients and micronized particles of a physiologically acceptable excipient in a suitable ratio by weight;
b) a fraction of coarse particles comprising a physiologically acceptable excipient having a mass diameter comprised between 150 and 400 micrometers, wherein the ratio between the fraction a) and the fraction b) is between 5:95 and 50:50 percent by weight, said formulation being obtainable by a process comprising the steps of:
  i) preparing a fraction of micronized particles of the active ingredient and the physiologically acceptable excipient;
  ii) optionally conditioning the obtained mixture;
  iii) subjecting the mixture to agglomeration and spheronisation to obtain the spheronised particles;
  iv) optionally sieving to isolate the fraction having the desired diameter;
  v) adding the fraction of coarse particles b) and
  vi) mixing the obtained mixture.

A fifth aspect concerns a dry powder formulation for administration by a dry powder inhaler (DPI) comprising:
  a) a fraction of spheronised particles having a mass diameter between 100 and 800 micrometers comprising micronized particles of one or more active ingredients and micronized particles of a physiologically acceptable excipient in a suitable ratio by weight;
  b) a fraction of coarse particles comprising a physiologically acceptable excipient having a mass diameter comprised between 150 and 400 micrometers, wherein the ratio between the fraction a) and the fraction b) is between 5:95 and 50:50 percent by weight, said formulation being obtained by a process comprising the steps of:
  i) preparing a fraction of micronized particles of the active ingredient and the physiologically acceptable excipient;
  ii) optionally conditioning the obtained mixture;
  iii) subjecting the mixture to agglomeration and spheronisation to obtain the spheronised particles;
  iv) optionally sieving to isolate the fraction having the desired diameter;
  v) adding the fraction of coarse particles b); and
  vi) mixing the obtained mixture.

In a sixth aspect, the invention concerns a dry powder inhaler filled with the claimed dry powder pharmaceutical formulation.

In a seventh aspect, the invention is directed to a package comprising a dry powder pharmaceutical formulation according to the invention and a dry powder inhaler.

In a further aspect, the invention refers to the formulation as above described for use as a medicament, preferably for the prevention and/or treatment of respiratory disease, more preferably selected from asthma and COPD.

DETAILED DESCRIPTION OF THE INVENTION

Definitions

The term "micron" and "micrometers" are used as synonymous.

By the term "physiologically acceptable" it is meant a safe, pharmacologically-inert substance.

By "daily therapeutically effective dose" it is meant the quantity of active ingredient administered by inhalation upon actuation of the inhaler.

Said daily dose may be delivered in one or more actuations (shots or puffs) of the inhaler.

By the term "fine particles" it is meant particles having a size up to few tenths of microns.

By the term "micronized" it is meant a substance having a size of few microns, typically comprised between 1 and 15 micron.

By the term "coarse" it is meant particles having a size of higher than 30 micron, typically of one or few hundred microns.

In general terms, the particle size of particles is quantified by measuring a characteristic equivalent sphere diameter, known as volume diameter, by laser diffraction.

The particle size can also be quantified by measuring the mass diameter by means of suitable known instrument such as, for instance, the sieve analyser.

The volume diameter (VD) is related to the mass diameter (MD) by the density of the particles (assuming a size independent density for the particles).

In the present application, the particle size of the active ingredients is expressed in terms of volume diameter, while that of the excipient is expressed in terms of mass diameter.

The particles have a normal (Gaussian) distribution which is defined in terms of the volume or mass median diameter (VIVID or MMD) which corresponds to the volume or mass diameter of 50 percent by weight of the particles, and, optionally, in terms of volume or mass diameter of 10% and 90% of the particles, respectively.

Another common approach to define the particle size distribution is the utilization of three values: i) the volume median diameter d(v,0.5) which is the volume diameter where 50% of the distribution is above and 50% is below; ii) d(v,0.9), where 90% of the volume distribution is below this value; iii) d(v,0.1), where 10% of the volume distribution is below this value. The span is the width of the distribution based on the 10%, 50% and 90% quantile and is calculated according to the formula.

$$\text{Span} = \frac{D[v, 0.9] - D[v, 0.1]}{D[v, 0.5]}$$

Upon aerosolisation, the particle size is expressed as mass aerodynamic diameter (MAD) and the particle size distribution as mass median aerodynamic diameter (MMAD). The MAD indicates the capability of the particles of being transported suspended in an air stream. The MMAD corresponds to the mass aerodynamic diameter of 50 percent by weight of the particles.

As used herein, the term "spheronised" refers to the term used in the art to indicate soft-pellets as for instance disclosed in WO 98/31351.

The term "spheronisation" refers to a process to make spheronised particles and includes different processes such as mixing and vibration.

It is carried out before adding the coarse excipient particles. In sharp contrast, in WO 01/78693 and in WO 2013/110632, said term was used to indicate the process of rounding off the coarse excipient particles at the end of the preparation of the final formulation. Spheronised particles do not form during this process when the amount of fine particles is lower than 20% by weight of the final formulation.

The term 'loading capacity' refers to the capability for the coarse excipient particles of accommodating on their surface a certain amount of fine particles either of the excipient and/or of the active ingredient. In the context of the present invention, it refers to the capacity of the coarse excipient particles of accommodating without segregation from the powder an amount of spheronized particles higher than 20 but lower than 60%%, preferably of about 30-40%.

The term "good flowability" refers to a formulation that is easy handled during the manufacturing process and can ensure an accurate and reproducible delivering of the therapeutically effective dose.

Flow characteristics can be evaluated by different tests such as angle of repose, Carr's index, Hausner ratio or flow rate through an orifice.

In the context of the present application the flow properties were tested by measuring the flow rate through an orifice according to the method described in the European Pharmacopeia (Eur. Ph.) 7.3, $7^{th}$ Edition or by angle of repose according to the US Pharmacopeia, 1174.

The expression "good homogeneity" refers to a formulation wherein, upon mixing, the uniformity of distribution of the active ingredient, expressed as coefficient of variation (CV) also known as relative standard deviation (RSD), is less than 2.5%, preferably equal to or less than 1.5%.

The expression 'physically stable in the device before use' refers to a formulation wherein the active particles do not substantially segregate and/or detach from the surface of the carrier particles both during manufacturing of the dry powder and in the delivery device before use. The tendency to segregate can be evaluated according to Staniforth et al. J. Pharm. Pharmacol. 34,700-706, 1982 and it is considered acceptable if the distribution of the active ingredient in the powder formulation after the test, expressed as relative standard deviation (RSD), does not change significantly with respect to that of the formulation before the test.

The expression "respirable fraction" refers to an index of the percentage of active particles which would reach the deep lungs in a patient.

The respirable fraction, also termed fine particle fraction (FPF), is evaluated using a suitable in vitro apparatus such as Andersen Cascade Impactor (ACI), Multi Stage Liquid Impinger (MLSI) or Next Generation Impactor (NGI), preferably by ACI, according to procedures reported in common Pharmacopoeias, in particular in the European Pharmacopeia (Eur. Ph.) 7.3, $7^{th}$ Edition.

It is calculated by the percentage ratio between the fine particle mass (formerly fine particle dose) and the delivered dose.

The delivered dose is calculated from the cumulative deposition in the apparatus, while the fine particle mass is calculated from the deposition of particles having a diameter <5.0 micron.

The term "prevention" means an approach for reducing the risk of onset of a disease.

The term "treatment" means an approach for obtaining beneficial or desired results, including clinical results. Beneficial or desired clinical results can include, but are not limited to, alleviation or amelioration of one or more symptoms or conditions, diminishment of extent of disease, stabilized (i. e. not worsening) state of disease, preventing spread of disease, delay or slowing of disease progression, amelioration or palliation of the disease state, and remission (whether partial or total), whether detectable or undetectable. The term can also mean prolonging survival as compared to expected survival if not receiving treatment.

The term 'therapeutically amount' means the amount of active ingredient that when delivered to the lungs via a dry powder formulation as described herein provides the desired biological effect.

The term "surface coating" refers to the covering of the surface of the excipient particles by forming a thin film of the ternary agent around said particles.

The term "dry powder inhaler (DPI)" refers to a device that delivers medication to the lungs in the form of a dry powder. DPIs can be divided into two basic types:
  i) single dose inhalers, for the administration of pre-subdivided single doses of the active compound;
  ii) multi-dose dry powder inhalers (MDPIs), either with pre-subdivided single doses or pre-loaded with quantities of active ingredient enough for multiple doses; each dose is created by a metering unit within the inhaler.

Based on the required inspiratory flow rates (l/min) which in turn are strictly depending on their design and mechanical features, DPI's are also divided in:
  i) low-resistance devices (>90 l/min);
  ii) medium-resistance devices (about 60-90 l/min);
  iii) medium-high resistance devices (about 50-60 l/min);
  iv) high-resistance devices (less than 30 l/min).

The reported classification is generated with respect to the flow rates required to produce a pressure drop of 4 KPa (KiloPascal) in accordance to the European Pharmacopoeia (Eur Ph).

By 'high single dose' it is meant a dose equal to or higher than 1 mg.

The invention is directed to a dry powder formulation for use in a dry powder inhaler (DPI) comprising:
  a) a fraction of spheronised particles having a diameter of from 100 to 800 micrometers comprising micronized particles of one or more active ingredients and micronized particles of a physiologically acceptable excipient in a suitable ratio by weight;
  b) a fraction of coarse particles constituted of a physiologically acceptable excipient having a mass diameter comprised between 150 and 400 micrometers, wherein the ratio between the fraction a) and the fraction b) is between 5:95 and 50:50 percent by weight.

In fact, it has been found that if fine excipient particles are pre-spheronised together with active ingredients particles, and then combined with coarse excipients particles, it is possible to achieve a high respirable fraction upon administration by inhalation avoiding the use of ternary agents.

The spheronised particles having the selected diameter allow to achieve a good uniformity of distribution of the active ingredient(s) as well as a small drug dosage variation or in other words, an adequate accuracy of the delivered doses. The rounded shape of the spheronised particles also enhance the flowability of the powder formulation as herein defined in detail.

In fact, formulations comprising the pre-spheronized particles according to the invention exhibit better flow properties than corresponding formulations comprising not-spheronized fine particles.

Diluting said spheronised particles with a coarse carrier made of particles are resistant to shear stress and compaction, allow to partition it into capsules or DPI devices using, for instance, filling technology usually suitable for carrier-based powder formulation and not convenient for pure soft pellets.

Said particles also turned out to be particularly suitable for the cup size of reservoir-based multidose inhalers. It has been found that advantageously said particles can substantially avoid the loosing of powder during the loading into the metering chamber.

The desired particle size may be obtained by sieving according to known methods.

Furthermore, another advantage of the invention is that the presence of the coarse excipient particles, with a selected, well-defined particle size, favors the breaking-up of the spheronised particles into the small particles during inhalation, making the technology of the invention particularly useful for the administration of active ingredients with medium-high or high-resistance dry powder inhalers.

By exploiting the platform technology of the invention, i.e. by combining the spheronised particles and the coarse particles in the claimed ratios, it is also possible to achieve a good flowability of the powder and an adequate physical stability in the device before use.

Advantageously, the micronized and coarse excipient particles may be constituted of any physiologically acceptable material or combination thereof; suitable for inhalatory use, so that the preparation of the present formulation results in a convenient and versatile process.

For example, said particles may be constituted of one or more materials selected from polyols, for example sorbitol, mannitol and xylitol, and crystalline sugars, including monosaccharides and disaccharides; inorganic salts such as sodium chloride and calcium carbonate; organic salts such as sodium lactate; and other organic compounds such as urea, polysaccharides, for example starch and its derivatives; oligosaccharides, for example cyclodextrins and dextrins.

Preferably, said particles are made of a crystalline sugar, even more preferably selected from: a monosaccharide such as glucose or arabinose, or a disaccharide such as maltose, saccharose, dextrose or lactose.

Preferably, said particles are made of lactose, more preferably of alpha-lactose monohydrate as said excipient is chemically and physically stable upon storage and easy to handle.

Advantageously, the spheronised particles have a mass diameter comprised between 100 and 800 micrometers. More advantageously, their diameter is comprised between 200 and 800 micrometers, preferably between 300 and 700 micrometers. It has in fact found that particles having a starting diameter of 200 micron turned out to be endowed with a particularly convenient flowability properties. In a particular preferred embodiment of the invention, the spheronised particles have a mass diameter comprised between 200 and 350 micron.

In one embodiment, the micronized particles of both the excipient and the active ingredient have a mass median diameter equal to or less than 15 micrometers, preferably equal to or less than 10 micrometers, more preferably from 1 to 6 micrometers.

The latter particle size is particularly suitable for active ingredients useful for the prevention/and treatment of respiratory disease.

In a particular embodiment, at least 90% of the particles of both the excipient and the active ingredient have a diameter of less than 6, even more preferably of less than 5 micron. More preferably they could have a mean median diameter of 2-4 micron.

According to the present invention, one or more active ingredients are present in the spheronised particles in an overall percentage comprised between 0.5 and 100% by weight, the remaining part being fine particles of excipient, and optionally additive particles. In some embodiments the percentage of one or more active ingredients is comprised between 1.0 and 99.5%, preferably between 2.0 and 95%, while in other embodiments, the percentage is comprised between 10 and 90% by weight, or comprised between 20 and 30% by weight.

In one embodiment, the spheronised particles are constituted of one or more active ingredients and fine particles of a physiologically acceptable excipient only.

In one embodiment of the invention, the coarse carrier particles of fraction b) have a mass diameter (MD) comprised between 150 and 400 micron, with a mass median diameter (MMD) preferably greater than 175 micron, preferably a MD between 200 and 380 micron, and more preferably the MD may be comprised between 210 and 355 micron.

The desired particle size may be obtained by sieving according to known methods.

When their MD is comprised between 210 and 355 micron, the carrier coarse particles may have a relatively highly fissured surface, that is, on which there are clefts and valleys and other recessed regions, referred to herein collectively as fissures.

As explained further, when percentages of the active ingredient higher than 20% are used, the presence of said fissures allow the spheronised particles forming spontaneously during mixing.

Furthermore, although spheronised particles have better flow properties than fine particles, when percentages of the active ingredient higher than 20% are used, the presence of said fissures on the surface of the coarse excipient particles still allows improving the flowability of the final formulation.

The "relatively highly fissured" coarse particles could be defined in terms of fissure index or rugosity coefficient as described for instance in WO 01/78695 and WO 01/78693, incorporated herein by reference, and they can be characterized according to the description therein reported.

Said carrier coarse particles may also be characterized in terms of tapped density or total intrusion volume measured as reported for instance in WO 01/78695.

The tapped density of the carrier coarse particles is advantageously less than 0.8 g/cm$^3$, preferably between 0.8 and 0.5 g/cm$^3$.

According to a preferred embodiment, to avoid their segregation from the powder, the spheronized particles and the coarse carrier particles shall have a substantially similar mass diameter. For example, if coarse carrier particles having a mass diameter of 210-355 micron are used, the spheronized particles shall preferably have a mass diameter comprised between 200 and 350 micron.

According to a preferred embodiment, the fraction a) only consists of micronized particles of one or more active ingredients and micronized particles of a physiologically acceptable excipient.

In an additional embodiment the formulation of the invention may further comprise a ternary agent.

When present, the ternary agent is preferably included in the spheronised particles.

Said ternary agent may be an amino acid, preferably selected from the group consisting of leucine, isoleucine, lysine, valine, methionine, and phenylalanine.

Alternatively, the ternary agent may include or consist of one or more water-soluble surface-active materials, for example lecithin.

In certain embodiments, the ternary agent may include or consist of one or more lubricant selected from the group consisting of stearic acid and salts thereof such as magnesium stearate, sodium lauryl sulphate, sodium stearyl fumarate, stearyl alcohol, sucrose monopalmitate.

Advantageously, the particles of the ternary agent have a mass median diameter equal to or less than 15 micrometers, equal to or less than 10 micrometers more preferably from 1 to 6 micrometers.

The optimum amount of additive material shall depend on the chemical composition and other properties of the additive material.

In general, the amount of additive shall be not more than 10% by weight, based on the total weight of the formulation. However, it is thought that for most ternary agents, their amount should be not more than 5%, preferably not more than 2% based on the total weight of the formulation.

When magnesium stearate is used as ternary agent, its amount is generally comprised between 0.01 and 2%, advantageously between 0.02 and 1%, more advantageously between 0.1% and 0.5% by weight based on the total weight of the formulation.

Depending on e.g. its amount and the time of mixing, magnesium stearate may coat the surface of the fine excipient particles in such a way as that the extent of the molecular surface coating is at least of 5%, preferably more than 10%, more preferably more than 15%, even more preferably equal to or more than and 25%.

When active ingredients with a relatively low dosage strength such as beta2-agonists, antimuscarinics drugs and corticosteroids are used, an amount of magnesium stearate comprised between 0.1% and 0.5% by weight is preferred, with an extent of molecular surface coating higher than 15%.

The extent of molecular surface coating, which indicates the percentage of the total surface of the excipient particles coated by magnesium stearate, may be determined by water contact angle measurement, as reported in literature, for instance in WO 2011/120779.

In one embodiment, the ratio between the fraction a) and the fraction b) is comprised between 5:99 and 50:50 percent by weight, more preferably between 10:90 and 30:70% by weight. In a still preferred embodiment, the ratio is comprised between 10:90 and 15:85% by weight. In a particular embodiment, said ratio is of 10:90 by weight.

The ratio between the fraction a) and the fraction b) is preferably 10:90 90 when active ingredients with a relatively low dosage strength such as beta2-agonists, antimuscarinics drugs and corticosteroids are used.

In another aspect, the invention is also directed to a process for preparing the formulation of the invention, said process comprising the steps of:

i) preparing a fraction of micronized particles of the active ingredient and the physiologically acceptable excipient;
ii) optionally conditioning the obtained mixture;
iii) subjecting the mixture to agglomeration and spheronisation to obtain the spheronised particles;
iv) optionally sieving to isolate the fraction having a diameter comprised between 100 to 800 micrometers;
v) adding a fraction of coarse particles comprising a physiologically acceptable excipient having a mass diameter comprised between 150 and 400 micrometers; and
vi) mixing the obtained mixture.

In an embodiment, the fraction of step i) is prepared by mixing the micronized particles of the active ingredient and micronized particles of the physiologically acceptable excipient.

Said mixing could be performed in any suitable mixer such as Turbula™ mixer, for a suitable time until a homogeneous distribution is achieved. Typically, when the Turbula™ mixer is used, the mixing time could vary from 30 minutes to 2 hours depending for instance on the amount of the active ingredient and the excipient, and the experimental conditions.

In an alternative embodiment, the fraction of step i) is prepared by co-micronizing the particles of the active ingredient and the particles of the physiologically acceptable excipient together, preferably by milling, then mixing.

This would allow avoiding the usual problem encountered during mixing of fine powders, i.e. the inability of mixers to break down powder agglomerates, requesting a further step of re-micronization as disclosed for instance in WO 98/31350.

Milling could be performed according to methods known in the art, for example using a ball mill or a jet mill for a time enough to achieve the desired particle size.

In step ii), the fraction of particles a) may optionally be subjected to a conditioning step, according to the conditions known in the art, as e.g. disclosed in WO 2011/131663.

Spheronisation of step iii) may be carried out according to methods reported in the art, for example in WO 98/31351 or WO 95/24889 or alternative methods based on mixing and vibration.

Typically, vibrating screening apparatus commercially available could be used, such as the vibrating screening AS 200 available from Retsch GmbH, Germany. The skilled person in the art shall select the method adjust the time of processing and other parameters to obtain the desired spheronized particles. In fact, vibration time and amplitude have an impact on the overall quality of said particles, and they can be fine-tuned to adjust particle size, sphericity and to limit the irregularities in the shape.

Typically, the time for achieving spheronisation is less than 5 minutes, or even lesser.

In a preferred embodiment of the invention, spheronisation of step iii) is carried out in a vibrating screening apparatus operating at a vibration frequency: 50 Hz, a vibration amplitude of 0.2-1.2 mm, and a vibration time of 60-200 sec By adopting said parameters, it is possible to obtain spheronized particles of a diameter comprised between 200 and 350 micron.

The presence and complete formation of the spheronised particles could be detected by microscopic analysis for example by scanning electronic microscopy (SEM) according to methods known to the skilled person. Any microscope available on the market could be suitably used, for instance the apparatus JSM-F100 (Jeol Ltd, Tokyo, Japan).

If necessary, the obtained spheronised particles are sieved according to methods known to the skilled person to better targeting the desired particle size.

The step vi) of mixing the coarse excipient particles b) and the fine particles a) is typically carried out in a suitable mixer, e.g. tumbler mixers such as Turbula™ (Willy A. Bachofen AG Switzerland), or other mixers for at least 30 minutes, preferably for no more than four hours, more preferably for three hours.

In a general way, the person skilled in the art shall adjust the time of mixing and the speed of rotation of the mixer to obtain a homogenous mixture but avoiding destruction of the spheronised particles.

In a preferred embodiment of the invention, the step vi) of mixing is carried out in a Turbula™ mixer operating at a rotation speed of 72 rpm. It has indeed been found that, if spheronized particles having a well-defined particle size are desired, by operating at lower speed, their size tend to increase with the time of mixing.

In an alternative process, spheronised particles form in situ during mixing all the components for at least 3 hours, preferably four hours.

It was indeed found that when the percentage of the active ingredient is higher than 20%, preferably equal to or higher than 25%, more preferably higher than 30% by weight of the formulation, and fissured coarse particles are used, the spheronised particles form spontaneously during mixing. Therefore, in such a case, the powder of the invention could advantageously be prepared by mixing all together the coarse excipient particles, the fine excipient particles and the active ingredient(s). This will result in saving time and possibly increasing the industrial feasibility of the manufacturing of the present formulation.

In particular, in fact, said approach is lesser time-consuming than the one envisioning the pre-preparation of the spheronised particles. Furthermore, the formation of spheronised particles by direct mixing with a coarse carrier as herein described, favors the control and the constancy of their size, thus improving the reproducibility and reliability of the process for their preparation.

As aforementioned, the resulting mixture can be optionally sieved. The sieving could be suitable when a selected, pre-determined particle size shall be used.

The active ingredient may be any pharmaceutically active compound which can be administered by inhalation in dry powders.

As an example, they may be chosen from short-acting and long-acting beta2-agonists such as terbutaline, reproterol, salbutamol, salmeterol, formoterol, carmoterol, milveterol, abediterol, indacaterol, olodaterol, fenoterol, clenbuterol, bambuterol, broxaterol, isoprenaline or hexoprenaline or stereoisomers, salts and/or solvate forms thereof; short-acting and long-acting anti-muscarinic antagonists such as tiotropium, ipratropium, oxitropium, oxybutynin, aclidinium, trospium, glycopyrronium, in form of salts and/or solvate forms thereof; short-acting and long acting corticosteroids such as butixocart, rofleponide, flunisolide budesonide, ciclesonide, mometasone and its ester, i.e furoate, fluticasone and its ester, i.e. propionate and furoate, beclometasone and its ester, i.e. propionate, loteprednol or triamcinolone acetonide and solvate forms thereof; leukotrien-antagonists, such as andolast, iralukast, pranlukast, imitrodast, seratrodast, zileuton, zafirlukast or montelukast; phosphodiesterase-inhibitors, such as filaminast, piclamilast or roflumilast; neutrophil elastase (HNE) inhibitors such as those disclosed in WO 2013/037809 and WO 2014/095700; and phosphoinositide 3-kinases inhibitors such as those disclosed in WO 2015/091685.

In as much as any of these compounds possess chiral centers, the compounds can be used in optically pure form, or can be presented as diastereomeric mixtures or racemic mixtures.

Formulations comprising a long beta2-agonist, an anti-muscarinic antagonist and/or a corticosteroid for inhalation, alone or in any combination thereof, constitute particular embodiments of the invention.

Advantageously, the muscarinic antagonist is an aclidinium salt, preferably as bromide salt, darifenacin, preferably as hydrobromide, a darotropium salt, preferably as bromide, a fesoterodine salt, preferably as fumarate, a glycopyrronium salt, preferably as bromide, an oxitropium salt, preferably as bromide, oxybutynin, preferably as hydrochloride or hydrobromide, a solifenacin salt, preferably as succinate, a tiotropium salt, preferably as bromide, a tolterodine salt, preferably as tartrate, a trospium salt, preferably as chloride and an umeclidinium salt, preferably as bromide. More preferred are glycopyrronium bromide in form of (3R,2R') enantiomer or racemic mixture (3 S,2R') and (3R, 2S'), and tiotropium bromide, even more preferred is the racemic mixture (3S,2R') and (3R,2S') of glycopyrronium bormide (hereinafter rac-glycopyrronium bormide).

The long-acting beta2-agonist, which may be present may be present in a particular salt and/or solvate form thereof, is preferably formoterol fumarate dihydrate, salmeterol xinafoate, milveterol hydrochloride, olodaterol hydrochloride, tulobuterol hydrochloride, and vilanterol trifenatate. More preferred is formoterol fumarate dihydrate.

The corticosteroids for inhalation, which may be present in a particular ester form and/or solvate form thereof, e.g. is beclometasone dipropionate or its monohydrate form, fluticasone propionate, fluticasone furoate, ciclesonide, flunisolide or its hemihydrate form, mometasone furoate, and triamcinolone acetonide. More preferred are budesonide, and even more preferred, beclometasone dipropionate.

In certain embodiment, formulations comprising the dihydrate form of formoterol fumarate and its combinations with corticosteroids for inhalation and/or muscarinic antagonists are preferred, in particular with beclometasone dipropionate and/or rac-glycopyrronium bromide.

In another embodiment of the invention, the dry powder formulation of the invention is useful for the administration of active ingredients to be delivered at single doses per actuation of the inhaler of 1 mg or higher, i.e. 2 mg, 5 mg or more, hereinafter high-dosage active ingredients.

It is known that powder formulations comprising high-dosage active ingredients such as antibiotics are currently on the market, for instance Tobi PodiHaler™.

Therefore, examples of high-dosage active ingredients are antibiotics such as ciprofloxacin, levofloxacin and colistin, tobramycin, amikacin and gentamicin; proteins such as insulin and α1-antitrypsin; antiviral drugs such as zanamivir and ribavirin; antifungal agents such as itraconazole, and phosphodiesterase (PDE)-5 inhibitors such as sildenafil and tadalafil.

The concentration of the active ingredient in the powder formulation will depend upon several aspects, such as for instance the shot weight of the formulation delivered upon actuation of the inhaler.

For example, considering an expected single dose of 1 mg, if the shot weight of the formulation delivered upon actuation of the inhaler is 10 mg, this would correspond to a concentration of the active ingredient of 10% w/w. Analogously, for a shot weight of 5 mg, the concentration of the active ingredient would be of 20% w/w, while for a shot weight of 20 mg, the concentration of the active ingredient would be of 5% w/w.

Therefore, the formulation of the invention might be particularly useful for the administration of active ingredients present in a high concentration, for instance from 4 to 30%, preferably from 10 to 25% w/w.

According to one aspect, the present invention refers to the formulation as herein described in detail for use as a medicament, even more preferably for the treatment of respiratory diseases. In preferred embodiments, said respiratory diseases are selected from asthma and COPD.

The present formulation is also useful for the preparation of a medicament for use in the treatment of respiratory diseases, preferably asthma and COPD.

The dry powder formulation for inhalation of the invention may be utilized with any dry powder inhaler, currently known to the skilled person.

In this respect, dry powder inhalers can generally be divided in: i) single-dose (unit-dose) inhalers, for the administration of single subdivided doses of the active compound;

ii) pre-metered multi-dose inhalers or reservoir inhalers pre-loaded with quantities of active principles sufficient for longer treatment cycles.

The dry powder formulations may be presented in unit dosage form.

Dry powder compositions for topical delivery to the lung by inhalation may, for example, be presented in capsules and cartridges of for example gelatin, or blisters of for example laminated aluminum foil, for use in an inhaler or an insufflator.

The dry powder formulation for inhalation according to the invention is particularly suitable for multi-dose dry powder inhalers comprising a reservoir from which individual therapeutic dosages can be withdrawn on demand through actuation of the device.

A preferred multi-dose device is the inhaler described in WO 2004/012801 and in WO 2016/000983.

Other multi-dose devices that may be used are for instance the DISKUS™ of GlaxoSmithKline, the TURBOHALER™ of AstraZeneca, TWISTHALER™ of Schering EASYHALER™ of Orion, SPIROMAX™ and AIRMAX™ of Teva, and CLICKHALER™ of Innovata.

As marketed examples of single-dose devices, there may be mentioned ROTOHALER™ of GlaxoSmithKline and HANDIHALER™ of Boehringer Ingelheim, and RS01 of Plastiape.

The following examples illustrate in detail the invention.

EXAMPLES

Example 1

A powder formulation was prepared having the unitary composition, i.e. the composition per shot of the inhaler, reported in Table 1

About 300 g of micronized beclometasone dipropionate (BDP) and 100 g of micronized lactose monohydrate were mixed for 2 minutes in a vibrating screening apparatus at frequency 50 Hz and oscillation amplitude 0.2 mm.

The powder mixture was collected in the bottom dish after passing a cascade of 100 µm. The collected spheronised pellets were gently screened through an 800 µm sieve.

The resulting spheronised particles were mixed with about 600 g of fissured coarse particles of alpha-lactose monohydrate having a mass diameter comprised between 212-355 micron, to obtain a ratio 40:60 percent by weight.

The mixing was carried out in a Turbula™ mixer for 2 hours at 23 rpm.

TABLE 1

| Components | Amounts | | |
|---|---|---|---|
| | Per shot of the inhaler | | Single dose |
| | mg | % | µg |
| Spheronised particles | 4 | 40 | |
| beclometasone dipropionate | 3 | | 3000 |
| alpha-lactose monohydrate | 1 | | |
| Alpha-lactose monohydrate 212-355 µm | 6 | 60 | |
| Total weight | 10 | 100 | |

The formulation was filled in the multidose dry powder inhaler (DPI) described in WO 2016/000983.

The evaluation of the aerosol performances was carried out using the Next Generation Impactor (NGI) according to the conditions reported in the European Pharmacopeia 8.5$^{th}$ Ed 2015, par 2.9.18, pages 309-320. After aerosolization of 3 doses from the inhaler device, the NGI apparatus was disassembled and the amounts of drug deposited in the stages were recovered by washing with a 50:50 v/v water: acetonitrile mixture and then quantified by High-Performance Liquid Chromatography (HPLC).

The following parameters, were calculated: i) the delivered dose which is the amount of drug delivered from the device recovered in the all parts of impactor; ii) the fine particle mass (FPM) which is the amount of delivered dose having a particle size equal to or lower than 5.0 micron; iii) the fine particle fraction (FPF) which is the ratio between the fine particle mass and the delivered dose; iv) the MMAD.

The results (mean value±S.D) are reported in Table 2.

TABLE 2

| BDP (active ingredient) | |
|---|---|
| Delivered Dose [µg] | 2.16 |
| Fine Particle Mass [µg] | 0.87 |
| Fine Particle Fraction [%] | 38.5 |
| MMAD [µm] | 2.26 |

As it can be appreciated an FPF of almost 40% was achieved.

Based on additional data collected by the applicant, it has been found that similar results are obtained if the total weight per shot of the inhaler is 20 mg.

In the prior art, for example in WO 01/78693 powder formulations comprising a carrier constituted of just coarse excipient particles and fine excipient particle not in form of soft pellets are disclosed in Example 5 gave rise to poorer aerosol performances, with an FPF seldom higher than 20%. In sharp contrast, the formulation prepared according to the teaching of the present invention surprisingly gives rise to good aerosol performances, and in particular almost 40% of FPF is achieved.

Example 2

A powder formulation can be prepared having the unitary composition, i.e. the composition per shot of the inhaler, reported in Table 3.

Suitable amounts of micronized formoterol fumarate dihydrate (about 0.3 g), micronized beclometasone dipropionate (about 5 g), and micronized lactose monohydrate (about 144.7 g) are mixed in a Turbula™ mixer to give the ratio within the spheronised particles reported in Table 3.

The mixture is subjected to conditioning at a temperature of 22±1° C. and at 75% relative humidity for one hour, then spheronised to agglomerates at room temperature at a controlled relative humidity of less than 50%.

The resulting spheronised particles are sieved to isolate the fraction having a mass diameter comprised between 200 and 800 micron, then mixed with about 350 g fissured coarse particles of alpha-lactose monohydrate having a mass diameter comprised between 212-355 micron, in the ratio 30:70 percent by weight.

TABLE 3

| Components | Amounts | | Single dose |
|---|---|---|---|
| | Per shot of the inhaler | | |
| | mg | % | µg |
| Spheronised particles | 3 | 30 | |
| formoterol fumarate dihydrate | 0.006 | | 6 |
| beclometasone dipropionate | 0.100 | | 100 |
| alpha-lactose monohydrate | 2.894 | | |
| Alpha-lactose monohydrate 212-355 µm | 7 | 70 | |
| Total weight | 10 | 100 | |

The formulation is filled in the multidose dry powder inhaler described in WO 2016/000983.

Example 3

Analogously to Example 2, another powder formulation can be prepared having the unitary composition, i.e. the composition per shot of the inhaler, reported in Table 4.

Suitable amounts of micronized formoterol fumarate dihydrate (about 0.1 g), micronized beclometasone dipropionate (about 1.67 g), micronized glycopyrronium bromide (0.21 g) and micronized lactose monohydrate (about 48.02 g) are mixed in a Turbula™ mixer to give the ratio within the spheronised particles reported in Table 4.

The mixture is subjected to conditioning at a temperature of 22±1° C. and at 75% relative humidity for one hour, then spheronised to agglomerates at room temperature at a controlled relative humidity of less than 50%.

The resulting spheronised particles are sieved to isolate the fraction having a dimeter comprised between 200 and 800 micron, then mixed with about 450 g of fissured coarse particles of alpha-lactose monohydrate having a mass diameter comprised between 212-355 micron, in the ratio 10:90 percent by weight.

TABLE 4

| Components | Amounts | | Single dose |
|---|---|---|---|
| | Per shot of the inhaler | | |
| | mg | % | µg |
| Spheronised particles | 3 | 30 | |
| formoterol fumarate dihydrate | 0.006 | | 6 |
| beclometasone dipropionate | 0.100 | | 100 |
| glycopyrronium bromide | 0.0125 | | 12.5 |
| alpha-lactose monohydrate | 2.8815 | | |
| Alpha-lactose monohydrate 212-355 µm | 7 | 70 | |
| Total weight | 10 | 100 | |

The formulation is filled in the multidose dry powder inhaler described in WO 2016/000983.

Example 4

Another powder formulation was prepared using the Human Neutrophil Elastase (HNE) inhibitor disclosed in WO 2014/095700 as active ingredient and quoted hereinafter as CHF 6333.

About 800 g of micronized as CHF 6333 was added to about 3.2 kg of a carrier prepared according to WO 01/78693. The blend was mixed for 3 hours in a Turbula™ mixer and sieved through a 600 µm sieve.

The resulting mixture contains a formulation according to the invention having the unitary composition, reported in Table 5.

The presence of and the complete formation of the spheronised particles was detected by scanning electron microscopy.

TABLE 5

| Components | Amounts | | Single dose |
|---|---|---|---|
| | Per shot of the inhaler | | |
| | mg | % | µg |
| Spheronised particles | 5.6 | 28 | |
| Micronized CHF 6333 | 4 | | 2000 |
| Magnesium stearate | 0.032 | | |
| Micronized alpha-lactose monohydrate | 1.568 | | |
| Alpha-lactose monohydrate 212-355 µm | 14.4 | 72 | |
| Total weight | 20 | 100 | |

The formulation was filled in the multidose dry powder inhaler described in WO 2016/000983 or in the single dose dry powder inhaler RS01 of Plastiape SpA (Italy).

The evaluation of the aerosol performances was performed as reported in Example 1. The results (mean value±S.D) are reported in Table 6.

TABLE 6

| CHF 6333 | Multidose DPI | Single Dose DPI |
|---|---|---|
| Delivered Dose [µg] | 1.92 | 1.53 |
| Fine Particle Mass [µg] | 0.80 | 1.18 |
| Fine Particle Fraction [%] | 41.7 | 77.1 |
| MMAD [µm] | 2.09 | 1.88 |

As it can be appreciated, good performances in term of FPF are achieved, in particular with a single-dose DPI.

Based on additional data collected by the applicant, it has been found that similar results are obtained if the total weight per shot of the inhaler is 20 mg.

Example 5

Two analogous formulations comprising CHF 6333 as active ingredient were prepared as reported in Example 4, but for the delivery of 1 mg and 4 mg single doses.

The formulations were filled in the single dose dry powder inhaler RS01 of Plastiape SpA (Italy).

The evaluation of the aerosol performances was performed as reported in Example 1. The results (mean value±S.D) are reported in Table 7.

TABLE 7

| CHF 6333 | 1 mg | 4 mg |
|---|---|---|
| Delivered Dose [µg] | 0.81 | 2.88 |
| Fine Particle Mass [µg] | 0.58 | 2.13 |
| Fine Particle Fraction [%] | 71.6 | 73.9 |
| MMAD [µm] | 2.15 | 1.85 |

Example 6

A further powder formulation was prepared having the unitary composition, reported in Table 1, but with spheronized particles having a mass diameter comprised 200 and 350 micron.

About 300 g of micronized beclometasone dipropionate (BDP) and 100 g of micronized lactose monohydrate were pre-mixed for 2 minutes.

Then the mixture was poured in a vibrating screening apparatus AS 200 from Retsch GmbH, Germany.

The system of two sieves and a collection dish on the vibrating pad were prepared.

The upper sieve (size>350 µm) is supposed to break any large size agglomerate or large scale inhomogeneity initially present in the powder sample.

The lower sieve (350 µm>size>250 µm) sets the characteristic of the desired spheronized particles. The bottom collection dish contains the spheronized material.

The micronized powder was poured on the upper dish and the vibrating systems was activated operating at a vibration frequency of 50 Hz, a vibration amplitude of 0.2-1.2 mm, and a vibration time of 60-200 sec The resulting spheronised particles were mixed with about 600 g of fissured coarse particles of alpha-lactose monohydrate having a mass diameter comprised between 212-355 micron, to obtain a ratio 40:60 percent by weight.

The mixing was carried out in a Turbula™ mixer for 3 hours at 75 rpm.

The formulation was filled in the multidose dry powder inhaler (DPI) described in WO 2016/000983.

The invention claimed is:

1. A dry powder formulation for administration by a dry powder inhaler (DPI) comprising:
   a) a fraction of spheronised particles having a mass diameter comprised between 100 and 800 micrometers comprising micronized particles of one or more active ingredients and micronized particles of a physiologically acceptable excipient;
   b) a fraction of coarse particles comprising a physiologically acceptable excipient having a mass diameter comprised between 150 and 400 micrometers;
   wherein the ratio between the fraction a) and the fraction b) is comprised between 5:95 and 50:50 percent by weight.

2. The dry powder formulation according to claim 1, wherein the spheronised particles have a mass diameter comprised between 200 and 800 micrometers.

3. The dry powder formulation according to claim 1, wherein the spheronized particles of fraction a) only consist of micronized particles of one or more active ingredients and micronized particles of a physiologically acceptable excipient.

4. The dry powder formulation according to claim 1, wherein the ratio between the fraction a) and the fraction b) is between 10:90 and 30:70 percent by weight.

5. The dry powder formulation according to claim 1, wherein one or more active ingredients are present in the spheronised particles of a) in an overall percentage comprised between 0.5 and 100% by weight.

6. The dry powder formulation according to claim 5, wherein the percentage of one or more active ingredients is comprised between 1.0 and 99.5% by weight.

7. The dry powder formulation according to claim 1, wherein the physiologically acceptable excipient is alpha-lactose monohydrate.

8. The dry powder formulation according to claim 1, wherein the mass diameter of the coarse particles of fraction b) is comprised between 210 and 355 micrometers.

9. The dry powder formulation according to claim 1, wherein the mass diameter of the spheronized particles of fraction a) is comprised between 200 and 350 micrometers and the mass diameter of the coarse particles of fraction b) is comprised between 210 and 355 micrometers.

10. The dry powder formulation according to claim 1, wherein the active ingredient is selected from the group consisting of beta2-agonists, and/or anti-muscarinic and/or inhaled corticosteroids.

11. The dry powder formulation according to claim 10, wherein the beta2-agonist is formoterol fumarate dihydrate.

12. The dry powder formulation according to claim 10, wherein the corticosteroid for inhalation is beclometasone dipropionate (BDP).

13. The dry powder formulation according to claim 10, wherein the muscarinic antagonist is glycopyrronium bromide.

14. The dry powder formulation according to claim 10, wherein the active ingredients is a combination of formoterol fumarate dihydrate, beclometasone dipropionate and glycopyrronium bromide.

15. A process for preparing the powder formulation of claim 1, said process comprising the steps of:
   i) preparing a fraction of micronized particles of the active ingredient and the physiologically acceptable excipient;
   ii) optionally conditioning the obtained mixture;
   iii) subjecting said mixture to agglomeration and spheronisation to obtain the spheronised particles;
   iv) optionally sieving to isolate the fraction having the desired diameter;
   v) adding the fraction of coarse particles b); and
   vi) mixing the obtained mixture.

16. The process according to claim 15, wherein the fraction of step i) is prepared by mixing micronized particles of the active ingredient and micronized particles of the physiologically acceptable excipient.

17. The process according to claim 15, wherein the fraction of step i) is prepared by co-micronizing the particles of the active ingredient and the particles of the physiologically acceptable excipient, then mixing.

18. A dry powder inhaler filled with the dry powder pharmaceutical formulation according to claim 1.

* * * * *